Figure 7:
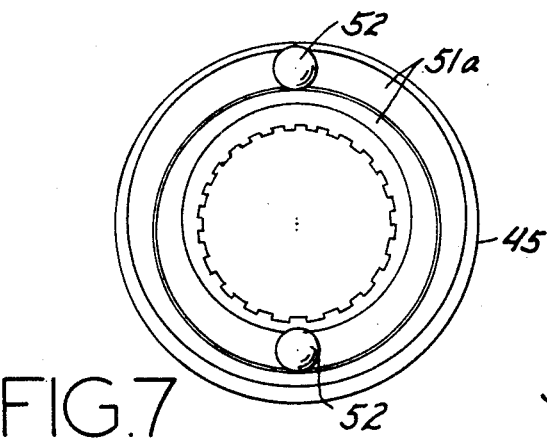

March 25, 1958  R. K. TIEDEMAN ET AL  2,827,994
FOLLOW-UP CLUTCHES
Filed Oct. 18, 1954  2 Sheets-Sheet 1
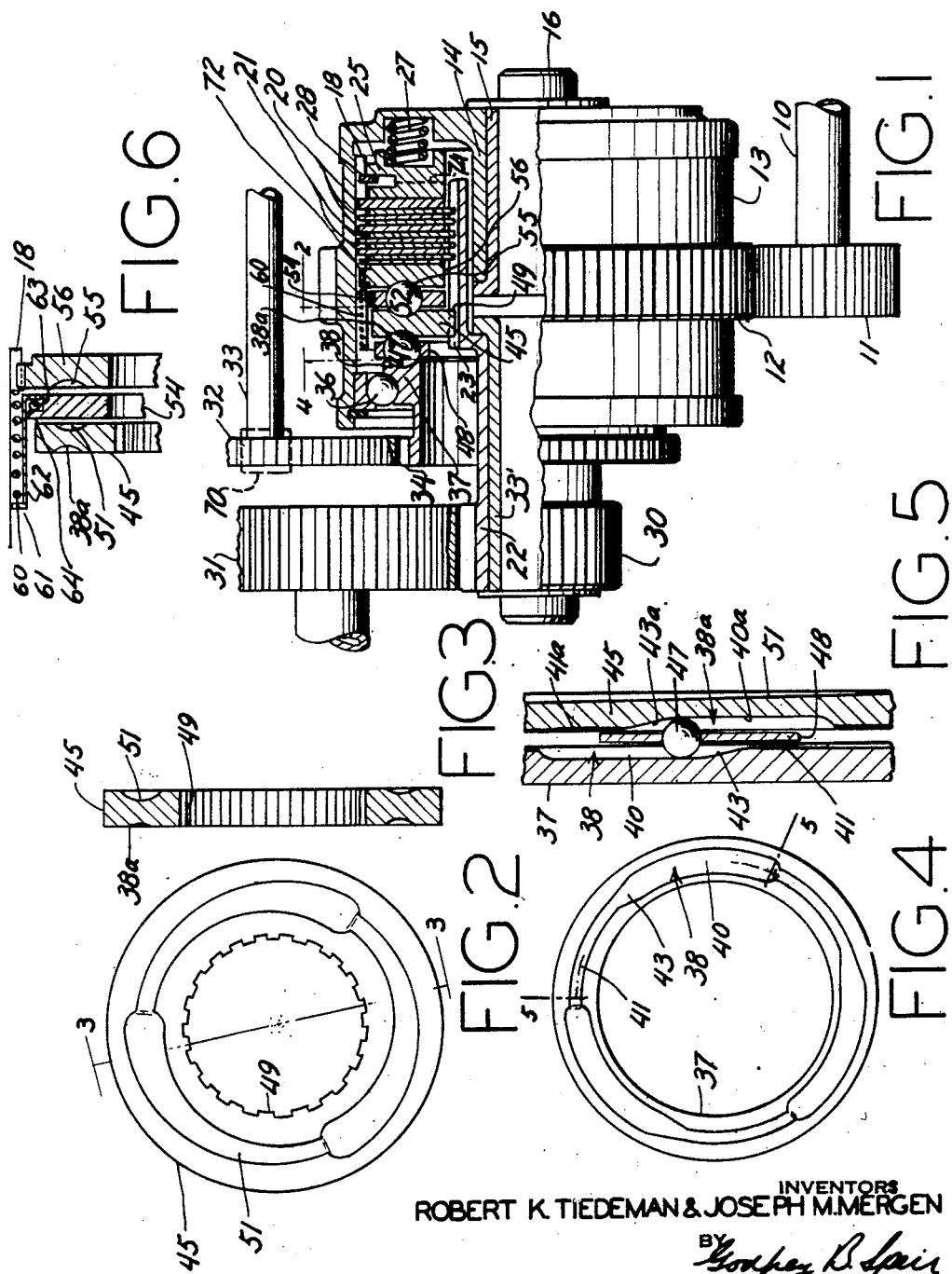
INVENTORS
ROBERT K. TIEDEMAN & JOSEPH M. MERGEN
BY
*Godfrey B. Spair*
ATTORNEY March 25, 1958  R. K. TIEDEMAN ET AL  2,827,994
FOLLOW-UP CLUTCHES
Filed Oct. 18, 1954  2 Sheets-Sheet 2

INVENTOR
ROBERT K. TIEDEMAN & JOSEPH M. MERGEN
BY
Godfrey B. Speir
ATTORNEY

United States Patent Office 2,827,994
Patented Mar. 25, 1958

2,827,994

FOLLOW-UP CLUTCHES

Robert K. Tiedeman, Packanack Lake, and Joseph M. Mergen, Verona, N. J., assignors to Curtiss-Wright Corporation, a corporation of Delaware Application October 18, 1954, Serial No. 462,926

14 Claims. (Cl. 192—93)

This invention relates to a mechanical torque-amplifying follow-up clutch, of a type wherein a control member is movable to exert light control force to energize a clutch which transmits powerful motion from a power source to an output member, motion of the latter being the same as that of the control member.

These mechanisms are useful in a variety of environments, including controllable aeronautical propeller pitch changing mechanisms, power plants, automotive vehicles and hydraulic equipment.

In prior art mechanisms of this sort, a clutch is partly or fully coupled to transmit power in response to variations in a control force, and where the clutch is only partly coupled over a protracted period, clutch slippage causes undue power loss due to temperature rise, and premature wear of the clutch friction faces. In the present mechanism, means are provided to energize and couple the clutch fully, with minimum slip, the coupling and uncoupling taking place with virtually snap action. This reduces consequent excessive wear and power loss, and enables precise and fast following of the control element by the power driven output element.

Objects of the invention are to provide a torque-amplifying follow-up mechanism of wholly mechanical character requiring only very small control force; to provide a snap-action mechanism for a clutch; to provide a mechanism enabling precise positioning of an output member relative to a control member; to provide a servo-mechanism of the type described whose components are easily fabricated and assembled, and to provide a mechanism wherein a control member sets up a clutch for engagement, but wherein relative motion between driving and driven members actually engages the clutch.

For an understanding of the details of the invention, reference should be had to the following detailed description which may be read in conjunction with the attached drawings showing an exemplary embodiment of the invention.

Figure 8:
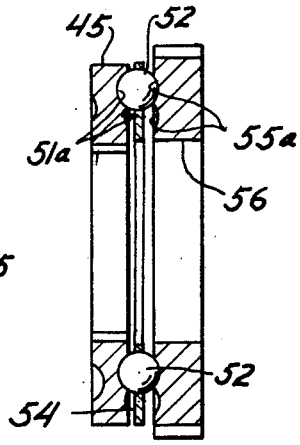
Figure 9:
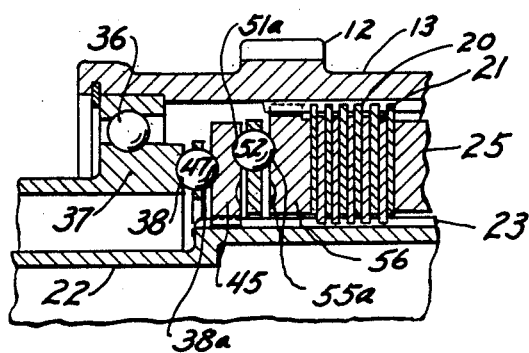

In the drawings wherein similar reference characters indicate similar parts,

Fig. 1 is an elevation of the mechanism, showing substantially half of it in longitudinal section, Fig. 2 is a view of a component on the line 2 of Fig. 1, Fig. 3 is a section on the line 3—3 of Fig. 2, Fig. 4 is a view of a component on the line 4 of Fig. 1, Fig. 5 is a developed section in part on the line 5—5 of Fig. 4, Fig. 6 is a fragmentary section showing certain elements of Fig. 1 in a different zone and slightly enlarged, Fig. 7 is a section like that of Fig. 2 showing an alternative element of the invention, Fig. 8 is a section on the line 8—8 of Fig. 7, and Fig. 9 is the longitudinal section through a part of the mechanism, including the alternative of Figs. 7 and 8.

In Fig. 1, a continuously rotating power shaft 10, driven by a power source (not shown) of any desired type, and which may be a constant speed source, drives a pinion 11 meshed with a gear 12 formed on a hollow clutch housing 13, an inner part 14 of the housing being journalled for rotation on a bushing 15 and a pilot shaft 16. The wall of the housing 13 is longitudinally splined at 18. A plurality of externally splined driving clutch plates or discs 20 are disposed within the housing 13, the plate splines engaging the housing splines 18.

Interleaved with the plates 20 are a plurality of driven clutch plates or discs 21, each having a splined hole, the plates 21 passing over an output shaft 22. Part of the shaft 22 is externally splined at 23 to engage the splines of the plates 21. At the right end, as shown, of the stack of plates 20, 21, is a reaction member 25, bearing on the end plate of the stack, and backed up by one or more stiff springs 27, the springs bearing on the housing 13 and urging the plate stack leftwardly. A stop ring 28 seated in a groove in the housing is engaged at times by the member 25, limiting its leftward movement. The output shaft 22 carries a suitable transmission element, such as a pinion 30 engaging an output gear 31. Shaft 22 is journalled on a bushing 32 carried by the pilot shaft 16.

Control input to the mechanism is from a shaft 33 having a gear 33' engaging a control gear 34 on the mechanism. This gear is concentric with the shaft 16 and housing 13, and is piloted in the latter and is restrained from axial movement by a ballbearing 36. The control shaft 33 and thus the control gear 34 are adapted to be driven by any suitable control instrumentality, at any speed from zero to an R. P. M. whereat gear 34 rotates at a speed equal to or less than the speed of the power driven gear 12. The desideratum is to have the output gear 30 follow, precisely, the rotation of the control gear 34 but with power boost from gear 12, to enable gear 30 to drive heavy loads. The gear 34 is preferably integral with an annular flange 37 having a plurality of similar face cam grooves 38 thereon. These grooves are preferably formed as shown in Figs. 4 and 5. Each groove includes a deep arcuate part 40, a shallow arcuate part 41 and a sloped fairly steep ramp 43 formed as a smooth transition between parts 40 and 41.

Opposite and coaxial with the flange 37 and cam grooves 38 is an annular member 45. The leftward face of this is formed with cam grooves 38a having parts 40a, 41a and 43a corresponding to the grooves and parts 38, 40, 41 and 43 of the flange 37.

As shown in Fig. 5, the facing cam grooves 38 and 38a have the deep parts 40 and 40a respectively at opposite ends, circumferentially. Between each pair of grooves 38 and 38a is a ball 47, the several balls of the plurality being carried in a retainer 48 so that ball spacing is held constant. Preferably there are three pairs of circumferential cam grooves 38 and 38a, and three balls 47. Different numbers of balls may be used if desired.

The member 45 has internal splines 49 engaging the output shaft splines 23, so that the member 45 rotates with the shaft 22 but is axially slidable therealong. When the output shaft 22 is not rotating, rotation of the input gear 34 rotates the flange 37, causing the balls to rotate along the cam grooves 38 and 38a, from the deep parts 40 and 40a up the ramps 43 and 43a and onto the shallow parts 41 and 41a. This shifts the member 45 rightwardly a certain distance determined by the rise of the ramps and readies the clutch plates 20 and 21 for engagement under the influence of the energizing mechanism now to be described.

The rightward face of the member 45 is provided with three, as shown, segmental rather steep ramp-like grooves 51. Each groove 51 varies in depth from deep at one end to shallow at the other on a substantially uniform slope, the shallow end of each groove adjoining the deep end of the next. A different number of cam grooves 51 may be used.

The rise in the grooves 51 is designed to be slightly less than the combined rise of the facing ramps 43 and 43a of grooves 38 and 38a on members 37 and 45.

Three balls 52 are disposed 120° apart and are held in this relation by a retainer 54. The balls 52 engage the grooves 51, and are also engageable at times with an annular race groove 55 formed in the face of a clutch pressure plate 56, coaxial with the other annular elements. The plate 56 has splines engaged with the splines 18 of the housing 13, to rotate therewith but to move axially relative thereto. The plate 56 on its rightward face engages the left end plate of the stack of clutch plates 20, 21.

In Figs. 1 and 6, it will be seen that the retainer 54, with its balls, is urged leftwardly by a spring 60 acting between the end of the splines 18 and a flange 61 on a band 62. The rightward end of the band is inwardly flanged to engage bearing balls 63 bearing against a race-flange 64 formed on the rim of the retainer 54.

When the clutch is uncoupled and there is no clutch closing signal from the gear 34, the spring 60 lightly holds the balls 52 against member 45, and member 45 with balls 47 against race grooves 38 of flange 47. By this resilient holding, balls 52 are free of contact with clutch pressure plate 56. Further, action of the spring 60 urges the retainer 54 to rotate relative to cam grooves 51, due to the slope of these grooves, so that balls 52 will lie in the deepest parts of the grooves 51. The housing 13 is power driven and the plate 56, plates 20 and elements 25 and 27 rotate therewith. With the mechanism inactive, the control gear 34 and output gear 30 are stationary, along with member 45.

Balls 47 are in the deep parts 40 and 40a of cam grooves 38 and 38a, and balls 52 are in the deep parts of grooves 51. As mentioned, these members are loaded into light contact by the spring 60. The clutch plates 20 and 21 are unloaded. Clutch plates 21, output shaft 22 and member 45 are not rotating.

Now, control gear 34 is rotated in the proper direction whereby balls 47 are quickly rolled up ramps 43 and 43a to shallow parts 41 and 41a, shifting member 45 to the right to engage balls 52 lightly with race grooves 55 on the member 56. Rotation of housing 13 and plate 56 relative to member 45 causes balls 52 to roll up grooves 51 promptly due to their steep slope, enforcing rightward axial movement of plate 56. The speed difference between housing 13 and output shaft 22 gives an inertia effect to roll the balls up grooves 51 to produce full-pressure clutch engagement. Clutch plates 20 and 21 impart rotation to output shaft 22 at the same speed as the housing, due to clutch lockup. The whole clutch stack 20, 21 may move rightwardly against the springs 27, whose force determines the torque load limit on the clutch. If heavy starting loads are imposed on the clutch, the clutch will slip slightly by action of the springs 27, but not by relaxation of the balls 52. In fact, if such slip should occur, the balls 52 will move farther up the grooves 51, moving the plate stack 20, 21 farther to the right and further compressing springs 27. Rotation of output member 22 will continue with housing 13 until member 22 rotates in advance of control gear 34 or until control gear 34 lags rotation of member 22, whereupon balls 47 will be rolled back to deep groove parts 40 and 40a, relieving the backing for member 45 by which the clutch has been held in engagement and is now relieved of engaging pressure. On this relief, balls 52 will relocate in the deep parts of grooves 51 as has been described.

Clutching action will have rotated output shaft 22 to a new position corresponding to the new position of control gear 34. The drive speed of the housing 13 will be preferably selected for a value greater than the fastest control speed of control gear 34, whereby output shaft 22 will follow rotation of control gear 34 promptly and precisely.

It will be seen that balls 47 cock the mechanism for clutch coupling, but exert no direct clutch coupling force upon control movement of gear 34. The axial shift of member 45 by balls 47 brings balls 52 into light clutch pressure plate engagement, whereupon the powerful rotation of plate 56 relative to member 45 forces the balls 52 up the grooves 51 to enforce, under power, clutch engagement.

The clutch will remain engaged, and members 45 and 56 will rotate together, so long as balls 47 are disposed in the shallow grooves 41 and 41a of members 37 and 45. It will be seen that pilot bearing 36 assumes the axial reaction force necessary to hold the clutch coupled, this force being transmitted through the elements 37, 47, 45 and 52.

The rise of grooves 51 in the member 45 is large enough to enforce bodily rightward movement of the clutch discs 20, 21 and to move the plate 25 to the right from the stop ring 28. This provides latitude for considerable clutch plate wear. Also, the rise of ramps 43 and 43a, together, is greater than the rise of ramp grooves 51, so that clutch disengagement will be certain upon control gear 34 release, even if balls 52 have dwelt well up on ramp grooves 51 at time of release. Should there be undue clutch slippage under load, which is unlikely, balls 52 may roll off the ends of the shallow ends of grooves 51 into the deep ends of the next groove, thereby releasing the clutch unless an energizing signal from gear 34 persists. Springs 27, as previously mentioned, provide for a clutch torque limit, which limit, if exceeded, will allow the clutch to slip.

Under normal conditions, even slight or slow control movements of gear 34 will enforce full, non-slipping clutch engagements for brief intervals of time, due to the high speed of the clutch housing relative to the output shaft 22 when the clutch is disengaged. This results in the output shaft always following the control gear 34 in relatively short, fast increments, the average output shaft speed being the same as the speed of control gear 34. The output shaft, if it tends to overrun the input shaft, immediately releases the clutch.

It will be noted that this clutch assembly is unidirectional in action. If a bi-directional system is desired, another similar clutch assembly is used, which rotates opposite to the first and responds to control signals opposite in sense to those used for the first clutch assembly. Control in both directions may be imparted to the two clutches from the same control shaft 33 and its gear 33'. If a control signal of wrong direction is received by the control gear 34 shown, it will merely roll balls 47 in groove parts 40 and 40a away from ramps 43 and 43a without engaging the clutch. Alternatively, a one-way brake or freewheel device, indicated at 70, may be inserted in the drive associated with the control gear 34 or the control flange 37.

It may be found desirable to incorporate a stop 72 in the form of a lock ring engaging a circumferential groove in splines 18, to limit leftward movement of the clutch pressure plate 56, whereby clearance is assured between the plate and balls 52 when the clutch is uncoupled. It may be desirable to incorporate wave springs between the clutch plates to urge them apart when the plates are uncoupled. Further, it may be desirable to incorporate a wear take-up device in the region 74. Each of the devices 70, 72 and 74 above mentioned are well known in the art and are not deemed to require detailed description or illustration.

Reference may be made to Figs. 7, 8 and 9 which show certain components of the invention arranged in alternative fashion. Herein the member 45 incorporates the grooves 38a as in the first embodiment but the grooves 51a on the opposite surface of the member are slightly different in character from the grooves 51. It will be seen in Fig. 7 that there are two variable depth grooves 51a opposite in phase to one another and lying one inside the other. Each groove has a deep portion and a shallow portion, the deep and shallow portions being joined by substantially uniformly sloped intermediate portions. A ball 52 engages each groove 51a and these in turn are engageable with either uniformly deep or variable depth grooves 55a in the member 56. Otherwise, the construction in Figs. 7, 8 and 9 may be the same as that shown in Figs. 1-6. The spring arrangement shown in Fig. 6 in the first embodiment of the invention may be omitted in the second embodiment.

In the operation of the second embodiment, when no clutch coupling signal is impressed on the control member 37, the member 45 may move freely along the splines 23 and the members 45 and 22 are non-rotative while the housing 13 rotates at some more or less fixed speed. If a light control signal starts rotation of the member 37, the ramps 43 and 43a will come in contact with balls 47, urging the member 45 rightwardly as shown. This brings the grooves 51a against balls 52, urging the balls into contact with the pressure plate 56 and initiating coupling of the clutch. If the control input signal is weak, the clutch closing force will be weak, allowing continued rotation of the member 56 relative to the member 45. This will cause the balls 52 to roll around the undulating grooves 51a, causing the member 45 to reciprocate back and forth due to the light pressure exerted in a rightward direction by the balls 47. If the control input force is sufficient on the member 37, when the member 45 reaches a rightward extreme of reciprocation, the input control member 37 will snap the balls 47 up the ramps 43 and 43a and on to the flat groove portions 41 and 41a of the members 37 and 45. When this occurs, as the member 56 rotates relative to the member 45, the balls 52 will roll to shallow parts of the grooves 51a, forcing rightward movement of the clutch pressure plate 56 and engaging the clutch for drive from the housing 13 to the driven member 22. This condition will exist so long as the control input signal causes rotation of the member 22. However, as soon as the member 22 advances rotationally ahead of the control member 37, the balls 47 will be allowed to roll down the ramps 43 whereupon the clutch disengages.

As in the previous arrangement, if slipping of the clutch should occur while control force is being exerted to close it, the balls 52 will roll into the deep portions of grooves 51a to permit clutch release.

The arrangements of this invention prevent protracted clutch slippage. It is necessary, of course, for the clutch to slip upon engagement and disengagement, and the provisions of this invention control the duration of clutch slippage to an interval which is tolerable to the clutch friction elements in respect to temperature rise and wear. As implied previously, the clutch is controlled to yield solid clutch engagement with short, fast pick-up and release, and the driven member 22 will follow the control member in quick, brief increments rather than at a steady rate which would require continuous clutch slippage.

While a preferred embodiment of the invention has been shown and described, it is to be understood that changes and modifications may be made therein without departing from the spirit or scope of the invention. Reference should be made to the following claims for a definition of the limits of the invention.

We claim:

1. A torque-amplifying follow-up mechanism for use with a constantly rotating power source and an independently variably rotating control source, comprising a power member driven by said power source and including a friction clutch element driven thereby, a second friction clutch element engageable with said first element, a controlled variably rotatable output member drivably connected to said second element, control means drivably connected to said output member and connectable to said power member positionable at times to engage said friction elements, means actuated by said control source and connected thereto operable to position said control means to engage said friction elements, and means to rotate said control source independently of said power-driven member and said output member.

2. A torque-amplifying follow-up mechanism for use with a constantly rotating power source and an independently variably rotating control source, comprising a rotating power member driven by said power source having a friction clutch element and clutch pressure plate driven thereby, a variably rotatable output member having a friction clutch element drivable therewith and engageable with said first clutch element to enable drive of said output member at times by said power member, said output member including a cam means rotatable therewith and axially movable relative thereto, pressure means between said cam means and pressure plate responsive to relative rotation thereof and to axial movement of said cam means to enforce driving contact of said friction elements, a control cam driven by said control source cooperative with said cam means held against axial movement, and means responsive to rotation of said control cam to shift said cam means in an axial direction.

3. A mechanism according to claim 2 wherein said cam means includes a sloped cam track and wherein said pressure means comprises a ball engageable with said cam track and said pressure plate.

4. A mechanism according to claim 2 wherein said control cam includes a sloped ramp and flat portions at different levels at the ends of the sloped ramp.

5. A mechanism according to claim 2 wherein said cam means includes a sloped cam track engageable with said pressure means and having a certain cam rise, and wherein said control cam includes a sloped ramp and end portions at different levels at the ends of the sloped ramp.

6. A mechanism according to claim 5 wherein the rise of said sloped ramp is greater than the certain rise of said cam track.

7. A mechanism according to claim 6, including resilient means urging said clutch elements into engagement and toward said pressure plate, and a mechanical stop engaging said resilient means limiting the expansion thereof toward said pressure plate.

8. In a clutch mechanism including driving and driven members having engageable friction elements rotatable, respectively, therewith, jointly and relatively axially movable pressure members respectively rotatable with said driving and driven members and including means to enforce axial movement of one pressure member relative to the other due to relative rotation therebetween, and control means selectively operable to move the other pressure member toward the one pressure member, said one pressure member, upon application of pressure thereon by said one member, being operative to engage said friction elements.

9. A mechanism according to claim 8 wherein said control means comprises a cam element rotatable with and relative to said other pressure member to enforce axial movement thereof.

10. In a clutch mechanism including driving and driven members having engageable friction elements rotatable, respectively, therewith, a rotatable control means rotatable independently of said driving and driven members, a member rotatable with said driven member and axially movable at times by said control means upon rotation thereof, other means actuated by axial movement of said rotatable member and responsive to relative rotation of said driving and driven members to enforce engagement of said friction elements, and means to rotate said rotatable control means independently of said driving and driven members.

11. A mechanism according to claim 10 including resilient means normally urging said other means toward said control means and away from said friction elements.

12. In a clutch mechanism including rotatable driving and driven members each including a friction element, said elements being axially movable into driving engagement with one another, cam means responsive to relative movement of said driving and driven means to enforce engagement of said friction elements, said cam means being movable between active and inactive positions respectively to enable said engagement and to prevent said engagement, selectively rotatable control means independent of said driving and driven members operable to move said cam means between active and inactive positions, said cam means including parts respectively driven by said driving and driven members, said control means including cam devices operable to shift one of said parts, and means to rotate said rotatable control means independently of said driving and driven members.

13. In a clutch mechanism including rotatable driving and driven members each including a friction element, said elements being axially movable into driving engagement with one another, cam means responsive to relative movement of said driving and driven means to enforce engagement of said friction elements, said cam means being movable between active and inactive positions respectively to enable said engagement and to prevent said engagement, and selectively rotatable control means independent of said driving and driven members operable to move said cam means between active and inactive positions, said cam means including parts respectively driven by said driving and driven members, said control means including a device operable to shift the driven part when the driven part position is divergent from control means position to engage said friction elements, and further operable to shift the driven part when the driven part position is like that of the control means to disengage said friction elements.

14. In a rotary clutch mechanism, coaxial driving and driven members, a stack of inter-leaved clutch plates, alternate plates being rotatable with one member and the other alternate plates being rotatable with the other member, a movable reaction plate at one end of said stack, resilient means urging said reaction plate into stack engagement, means to limit the extent of movement of said reaction plate in the direction of stack engagement, said reaction plate and limiting means being carried by said driving member, an axially movable pressure plate rotatable with said driving member and engageable against the other end of said stack, said pressure plate including an annular groove, an energizing member axially movable along and rotatable with said driven member having a circumferential cam groove facing said annular groove, said cam groove having an axial rise of certain amount, a first ball between said latter members engageable with said annular and cam grooves, a rotatable control member including a face opposite a face of said energizing cam, said opposite faces having circumferential cam truck grooves and a ball disposed therein, said cam tracks having a joint rise greater than the certain rise of said circumferential cam groove, and resilient means to urge said first ball to the part of said cam groove farthest removed from said pressure plate.

References Cited in the file of this patent
UNITED STATES PATENTS

| | | |
|---|---|---|
| 2,530,796 | Weyant | Nov. 21, 1950 |
| 2,649,941 | Doebeli | Aug. 25, 1953 |